(12) United States Patent
Lee et al.

(10) Patent No.: US 10,394,513 B2
(45) Date of Patent: Aug. 27, 2019

(54) DISPLAY DEVICE AND DISPLAY APPARATUS

(71) Applicant: CHAMP VISION DISPLAY INC., Hsinchu County (TW)

(72) Inventors: Hsin-Hung Lee, Hsin-Chu (TW); Kuo-Lung Lin, Hsin-Chu (TW); Chiao-Chih Yang, Hsin-Chu (TW)

(73) Assignee: CHAMP VISION DISPLAY INC., Hsinchu County (TW)

( * ) Notice: Subject to any disclaimer, the term of this patent is extended or adjusted under 35 U.S.C. 154(b) by 95 days.

(21) Appl. No.: 15/662,265

(22) Filed: Jul. 27, 2017

(65) Prior Publication Data
US 2018/0267767 A1  Sep. 20, 2018

(30) Foreign Application Priority Data
Mar. 17, 2017  (CN) .......................... 2017 1 0160910

(51) Int. Cl.
*G09G 5/00*  (2006.01)
*G06F 3/14*  (2006.01)
(Continued)

(52) U.S. Cl.
CPC ....... *G06F 3/1446* (2013.01); *G02B 27/0068* (2013.01); *G02B 5/04* (2013.01);
(Continued)

(58) Field of Classification Search
CPC ...... G06F 3/1446; G02B 27/0068; G02B 5/04
See application file for complete search history.

(56) References Cited

U.S. PATENT DOCUMENTS 9,146,400 B1 * 9/2015 Lee .................... G02B 3/0037
2006/0077544 A1  4/2006 Stark
(Continued)

FOREIGN PATENT DOCUMENTS

CN   103226918    7/2013
CN   203337938   12/2013
(Continued)

OTHER PUBLICATIONS

"Office Action of Taiwan Counterpart Application," dated Oct. 18, 2017, p. 1-p. 8, in which the listed references were cited.

*Primary Examiner* — Adam R. Giesy
(74) *Attorney, Agent, or Firm* — JCIPRNET

(57) ABSTRACT

A display device includes a display panel, a transparent plate and at least one compressible transparent member. The display panel has a display surface. The transparent plate is disposed on the display panel and has a light incident surface and a first light emitting surface opposite to each other. The display surface and the light incident surface face each other, and the transparent plate has at least one side surface connected between the light incident surface and the first light emitting surface. The compressible transparent member is disposed on the side surface and has a second light emitting surface, and the second light emitting surface is tilted relative to the first light emitting surface. Moreover, a display apparatus including a plurality of the display devices is also provided. When the display devices are spliced to form the display apparatus, the problem of visible black lines of splicing seams is mitigated.

16 Claims, 5 Drawing Sheets

(51) Int. Cl.
  *G02B 27/00* (2006.01)
  *G02B 5/04* (2006.01)
(52) U.S. Cl.
  CPC ............... *G09G 2300/026* (2013.01); *G09G 2300/0421* (2013.01)

(56) References Cited

U.S. PATENT DOCUMENTS

| | | | |
|---|---|---|---|
| 2010/0238090 A1* | 9/2010 | Pomerantz | G02F 1/13336 345/1.3 |
| 2015/0286457 A1* | 10/2015 | Kim | G06F 3/1446 345/581 |
| 2016/0054606 A1 | 2/2016 | Saishu et al. | |

FOREIGN PATENT DOCUMENTS

| | | |
|---|---|---|
| TW | I354161 | 12/2011 |
| TW | I557700 | 11/2016 |

\* cited by examiner

DISPLAY DEVICE AND DISPLAY APPARATUS

CROSS-REFERENCE TO RELATED APPLICATION

This application claims the priority benefit of China application serial no. 201710160910.X, filed on Mar. 17, 2017. The entirety of the above-mentioned patent application is hereby incorporated by reference herein and made a part of this specification.

BACKGROUND OF THE INVENTION

Field of the Invention

The invention relates to a display device and display apparatus, and particularly relates to a display device for mutual splicing and display apparatus including a plurality of the display devices.

Description of Related Art

An existing television (TV) wall splicing technique is to stack and assemble a plurality of small displays to form a large TV wall, and due to borders of the displays and seams exist between the displays, a plurality of visible black lines is shown in an image frame when the TV wall displays, which influences a display quality. In order to mitigate the problem of the visible black lines of the TV wall, displays of a slim border are developed to narrow the seams existed between the displays when the displays are spliced. However, even the displays with the narrowest borders are adopted, in order to avoid mutual extrusion of the displays to cause damage, a certain safety distance has to be retained, so that the TV wall still has the splicing seams.

A seamless splicing technique is developed in recent years, where an optical element is installed on a display surface of the display to enlarge or duplicate the image frame, so as to shield the borders of the displays and the splicing seams on the TV wall. However, the optical elements installed on the displays still have seams there between due to an assembly tolerance, such that the TV wall still has the splicing seams, and the problem of visible black lines of the TV wall cannot be completely resolved.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY OF THE INVENTION

The invention is directed to a display device and display apparatus, where when a plurality of the display devices are spliced to form the display apparatus, a problem of visible black lines of splicing seams is mitigated.

Other objects and advantages of the invention can be further illustrated by the technical features broadly embodied and described as follows.

In order to achieve one or a portion of or all of the objects or other objects, an embodiment of the invention provides a display device including a display panel, a transparent plate and at least one compressible transparent member. The display panel has a display surface. The transparent plate is disposed on the display panel. The transparent plate has a light incident surface and a first light emitting surface opposite to each other. The display surface and the light incident surface face each other, and the transparent plate has at least one side surface connected between the light incident surface and the first light emitting surface. The at least one compressible transparent member is disposed on the at least one side surface. The at least one compressible transparent member has a second light emitting surface, and the second light emitting surface is tilted relative to the first light emitting surface.

In order to achieve one or a portion of or all of the objects or other objects, an embodiment of the invention provides a display apparatus including a plurality of the aforementioned display devices, the display devices are spliced in an array, where at least one compressible transparent member is compressed between the corresponding transparent plate and the transparent plate of another display device.

According to the above description, after the plurality of display devices of the invention are spliced into the display apparatus, each of the compressible transparent members is pressed to lean against between corresponding two adjacent display devices, so as to fill up the splicing seam between the two adjacent display devices. Since the light emitting surface (i.e. the second light emitting surface) of the compressible transparent member is tilted relative to the light emitting surface (i.e. the first light emitting surface) of the display device, an image beam sent from the display panel to the compressible transparent member can be refracted by the compressible transparent member, and emitted from the splicing seam along a direction perpendicular to the light emitting surface of the display device. In this way, the problem of visible black lines of the splicing seams is mitigated, and the display apparatus may display a correct image at the splicing seams.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
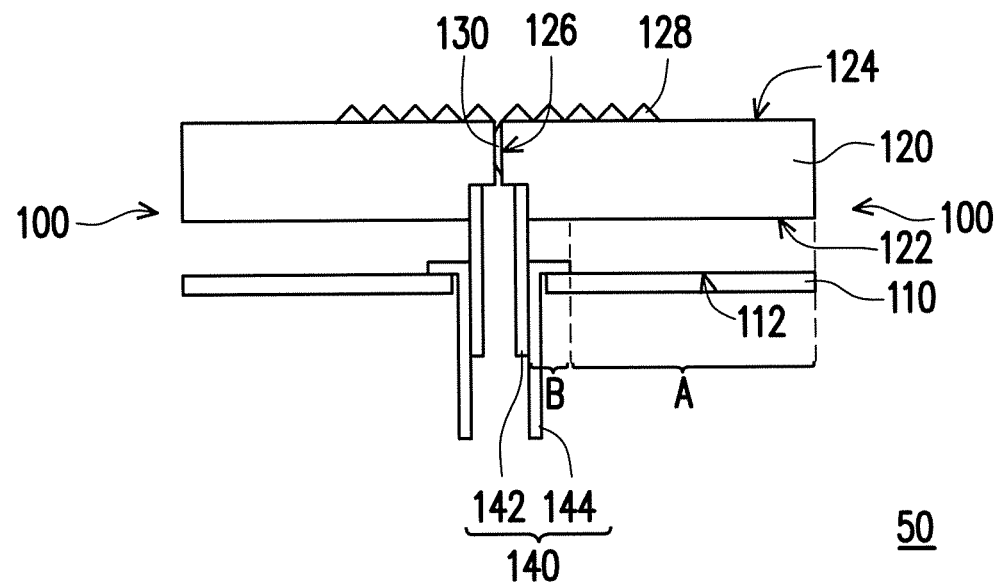
FIG. 1 is a partial cross-sectional view of display apparatus according to an embodiment of the invention.
Figure 2:
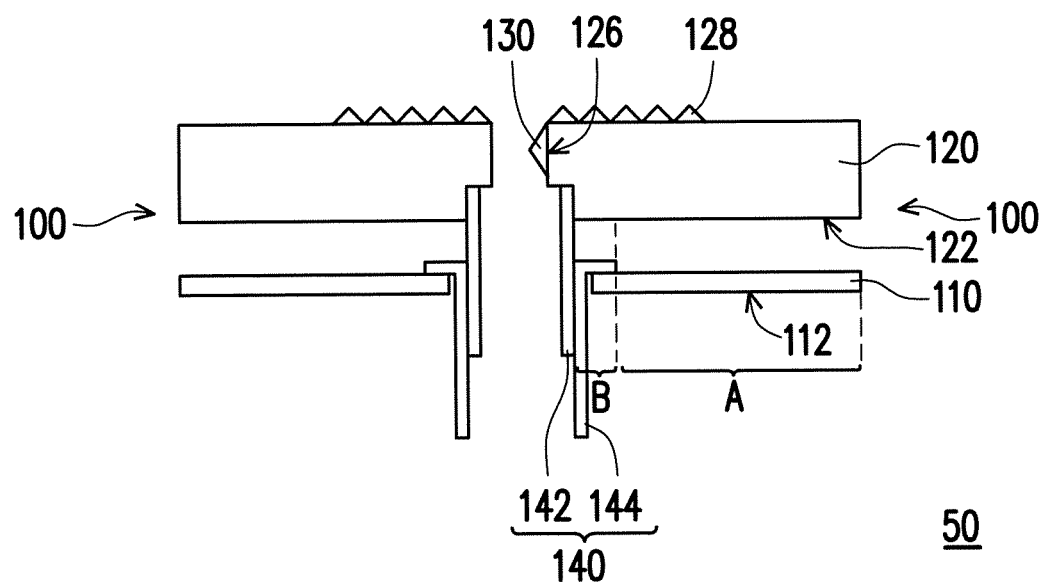
FIG. 2 is an exploded view of the display apparatus of FIG. 1.

FIG. 1 is a partial cross-sectional view of display apparatus according to an embodiment of the invention. FIG. 2 is an exploded view of the display apparatus of FIG. 1. Referring to FIG. 1 and FIG. 2, the display apparatus 50 of the present embodiment includes a plurality of display devices 100 (two display devices are shown) spliced in an array. Each of the display devices 100 includes a display panel 110, a transparent plate 120 and at least one compressible transparent member 130. The transparent plate 120 is disposed on the display panel 110. The compressible transparent member 130 is disposed on the transparent plate 120. The transparent plate 120 is, for example, made of polymethylmethacrylate (PMMA), polycarbonate (PC) or glass, which is not limited by the invention. In the present embodiment, the compressible transparent member 130 can be made of silicone and is forming through resin transfer molding, and is, for example, an elastic member with a Shore hardness (ShoreA) between 40 and 85 and a refractive index between 1.41 and 1.53, though the invention is not limited thereto.

In detail, the display panel 110 has a display surface 112. The transparent plate 120 has a light incident surface 122 and a first light emitting surface 124 disposed opposite to each other in a vertical direction. The display surface 112 of the display panel 110 and the light incident surface 122 of the transparent plate 120 face each other, and the transparent plate 120 has at least one side surface 126 connected between the light incident surface 122 and the first light emitting surface 124. The compressible transparent member 130 is disposed on the at least one side surface 126 of the transparent plate 120.

Figure 3:
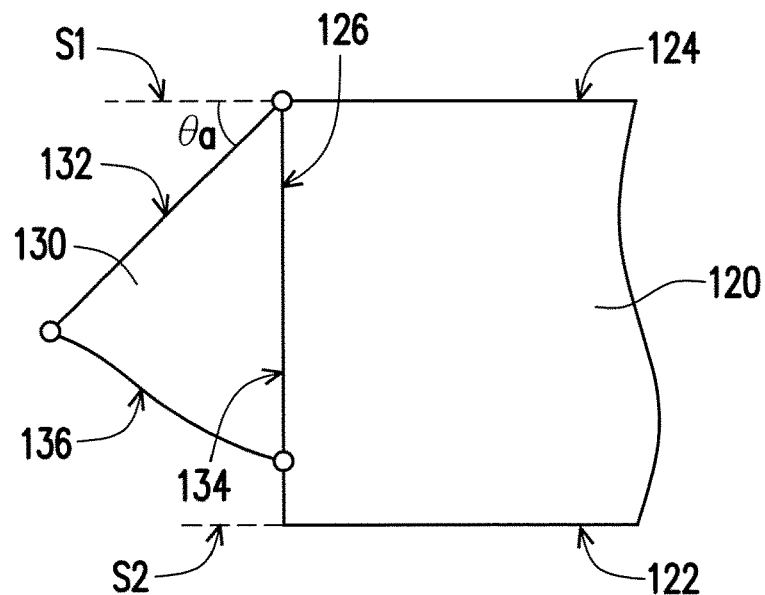
FIG. 3 is a partial schematic diagram of the display apparatus of FIG. 2.

FIG. 3 is a partial schematic diagram of the display apparatus of FIG. 2. Referring to FIG. 3, the compressible transparent member 130 has a second light emitting surface 132 and an attaching surface 134, and the second light emitting surface 132 is tilted relative to the first light emitting surface 124 of the transparent plate 120. An included angle between the second light emitting surface 132 and an extending surface S1 of the first light emitting surface 124 is defined as a tilt angle θa of the second light emitting surface 132 relative to the first light emitting surface 124.

A detailed structure of the compressible transparent member 130 is as follows. A width of the compressible transparent member 130 along a direction parallel to the side surface 126 is gradually decreased along a direction away from the side surface 126 as that shown in FIG. 3, and a distance between the extending surface S1 of the first light emitting surface 124 and the second light emitting surface 132 is gradually increased along the direction away from the side surface 126. The attaching surface 134 of the compressible transparent member 130 is attached to the side surface 126 of the transparent plate 120, and the second light emitting surface 132 is tilted relative to the attaching surface 134. The compressible transparent member 130 is completely located between the extending surface S1 of the first light emitting surface 124 and an extending surface S2 of the light incident surface 122, and the second light emitting surface 132 is located adjacent to the first light emitting surface 124. Moreover, the at least one compressible transparent member 130 has a surface 136, where the surface 136 is located between the second light emitting surface 132 and the attaching surface 134, and is connected to the second light emitting surface 132 and the attaching surface 134. The surface 136 is similar to a slope, so that a cross section of the compressible transparent member 130 is similar to an isosceles triangle. In other embodiments, the cross section of the compressible transparent member 130 may have other proper shapes, for example, a trapezoid, though the invention is not limited thereto.

Under the aforementioned configuration, each of the compressible transparent members 130 is pressed to lean against between corresponding two adjacent display devices 100, so as to fill up a splicing seam between the two adjacent display devices 100. Since the light emitting surface (i.e. the second light emitting surface 132) of the compressible transparent member 130 is tilted relative to the light emitting surface (i.e. the first light emitting surface 124) of the display device 100, an image beam I (referring to FIGS. 4A-4C) sent from the display panel 110 to the compressible transparent member 130 can be refracted by the compressible transparent member 130, and emitted from the splicing seam along a direction perpendicular to the light emitting surface of the display device 100. In this way, a problem of visible black lines of the splicing seams is mitigated, and the display apparatus 50 may display a correct image at the splicing seams.

Figure 4A:
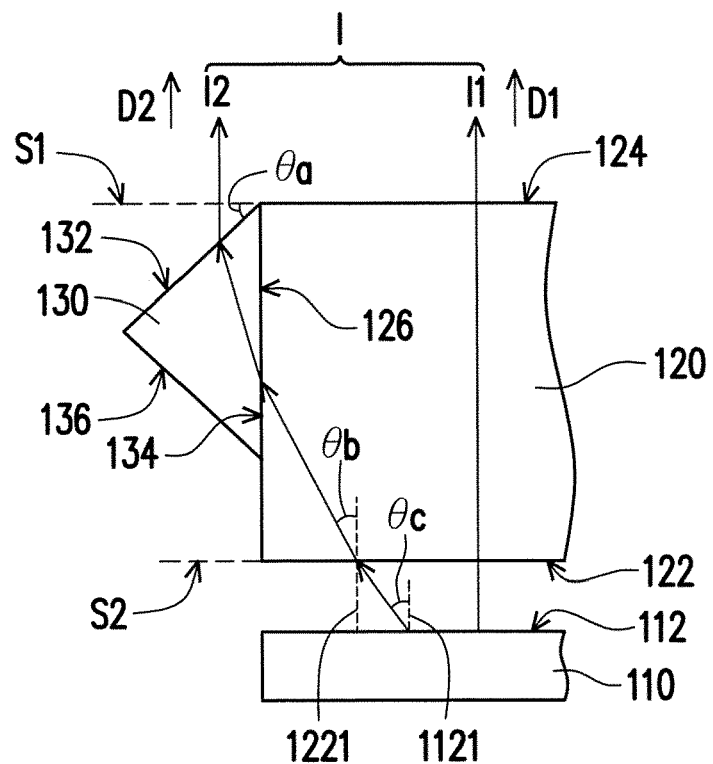
FIG. 4A to FIG. 4C respectively illustrate the compressible transparent member of FIG. 3 in different compression degrees.
Figure 4B:
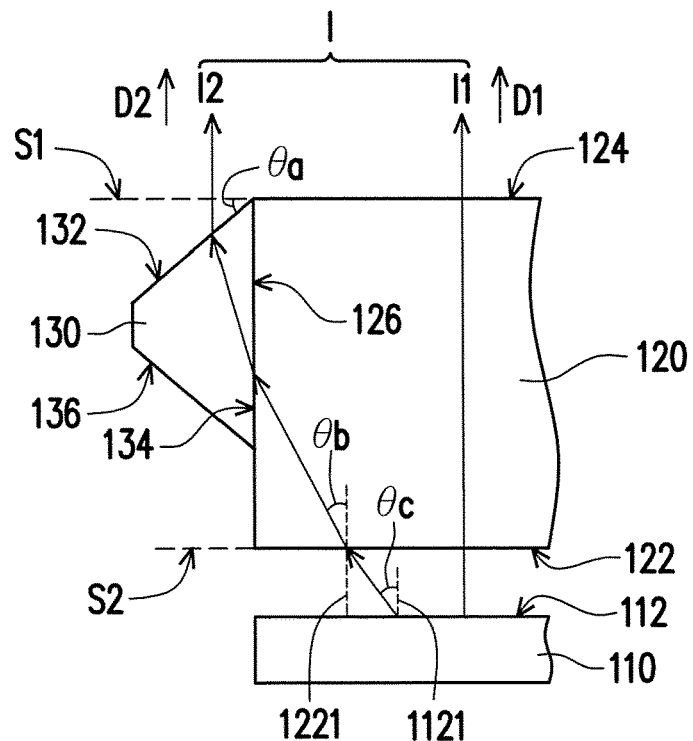
Figure 4C:
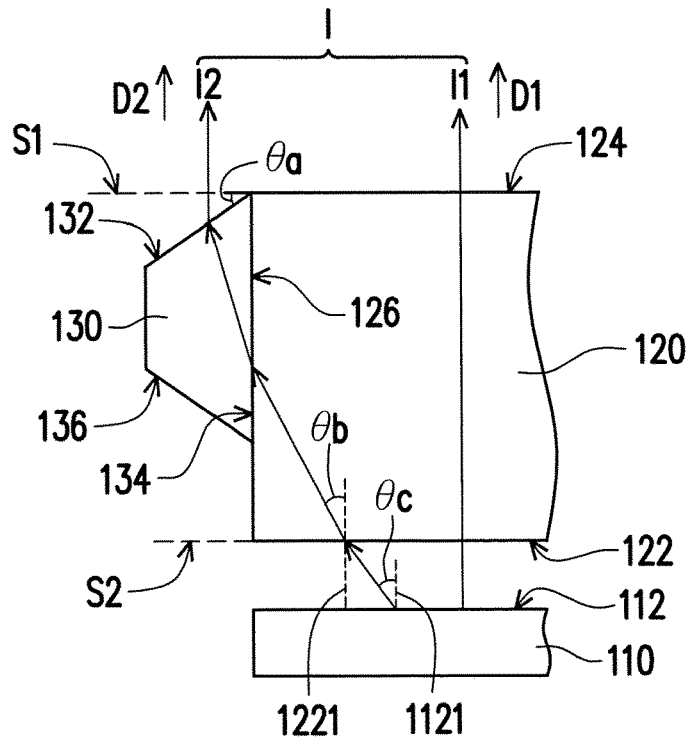

A method that the compressible transparent member 130 of the embodiment refracts the image beam is described in detail below. FIG. 4A to FIG. 4C respectively illustrate the compressible transparent member of FIG. 3 in different compression degrees. In the embodiment, the transparent plate 120 is, for example, made of PMMA (with a refractive index of 1.49), and the compressible transparent member 130 is, for example, made of silicone (with a refractive index of 1.41). Referring to FIG. 4A, the compressible transparent member 130 is not compressed, and under such state, the tilt angle θa of the second light emitting surface 132 relative to the first light emitting surface 124 is, for example, 45 degrees. The image beam I enters the transparent plate 120 through the light incident surface 122, where a first portion I1 (i.e. the image beam located away from the side surface 126) of the image beam I is emitted out of the transparent plate 120 through the first light emitting surface 124, and a second portion I2 (i.e. the image beam located close to the side surface 126) of the image beam I enters the compressible transparent member 130 through the side surface 126, and is emitted out of the compressible transparent member 130 through the second light emitting surface 132. As shown in FIG. 4A, the first portion I1 of the image beam I is emitted out of the transparent plate 120 along a first direction D1, and the second portion I2 of the image beam I is emitted out of the compressible transparent member 130 along a second direction D2, where the first direction D1 and the second direction D2 are the same, and are all directions perpendicular to the first light emitting surface 124. Namely, not only the first portion I1 of the image beam I can be emitted in the direction perpendicular to the first light emitting surface 124, the second portion I2 of the image beam I can also be emitted in the direction perpendicular to the first light emitting surface 124, such that the display apparatus 50 may display a correct image at the splicing seams.

Under the aforementioned state that the compressible transparent member 130 is not compressed, regarding the second portion I2 refracted in a light path shown in FIG. 4A and emitted out vertically, an included angle θb between the second portion I2 in the transparent plate 120 and a normal line 1221 of the light incident surface 122 is, for example, 24 degrees. An included angle θc between the second portion I2 and a normal line 1121 of the display surface 112 is, for example, 37 degrees. When the compressible transparent member 130 is compressed and deformed, the tilt angle θa of the second light emitting surface 132 relative to the first light emitting surface 124 is accordingly changed, and the included angle θb between the second portion I2 and the normal line 1221 of the light incident surface 122 that is complied with the aforementioned condition is accordingly changed. To be specific, when the compressible transparent member 130 is compressed to decrease the tilt angle θa to, for example, 43 degrees as that shown in FIG. 4B, the included angle θb between the second portion I2 and the normal line 1221 of the light incident surface 122 is accordingly changed to, for example, 23 degrees, and the included angle θc between the second portion I2 and the normal line 1121 of the display surface 112 is, for example, 36 degrees. Similarly, when the compressible transparent member 130 is further compressed to further decrease the tilt angle θa to, for example, 39 degrees as that shown in FIG. 4C, the included angle θb between the second portion I2 and the normal line 1221 of the light incident surface 122 is accordingly changed to, for example, 22 degrees, and the included angle θc between the second portion I2 and the normal line 1121 of the display surface 112 is, for example, 34 degrees.

According to the above description, it is known that the larger a compression degree of the compressible transparent member 130 is, the smaller an initial skew angle (i.e. the included angle θb) of the second portion I2 in the transparent plate 120 is, and the smaller a light emitting angle (i.e. the included angle θc) of the second portion I2 of the image beam I coming from the display surface 112 of the display panel 110 is. Since a brightness of the display panel 110 is related to the light emitting angle of the second portion I2, the brightness of the display panel 110 is increased along with gradual decrease of the light emitting angle of the second portion I2. Therefore, the larger the compression degree of the compressible transparent member 130 is, the smaller the light emitting angle (i.e. the included angle θc) of the second portion I2 of the image beam I coming from the display surface 112 of the display panel 110 is, and the larger the brightness is. Namely, in the embodiment, the brightness of the image beam I (i.e. the second portion I2) emitted out from the second light emitting surface 132 of the compressible transparent member 130 is not decreased as the compressible transparent member 130 is compressed, but is relatively increased as the compressible transparent member 130 is compressed. Therefore, the display apparatus 50 is ensured to have enough display brightness at the splicing seams.

In the embodiment, the tilt angle θa of the second light emitting surface 132 relative to the first light emitting surface 124 can be 30-60 degrees. In detail, if the light emitting angle (i.e. the included angle θc) of the second portion I2 of the image beam I coming from the display surface 112 of the display panel 110 is 45 degrees, the brightness thereof is about to be decreased to 50% of the case that the light emitting angle (i.e. the included angle θc) is 0 degree, and now the tilt angle θa is, for example, 60 degrees. Therefore, if the light emitting angle (i.e. the included angle θc) of the second portion I2 of the image beam I is greater than 45 degrees, the brightness is inadequate, and the user may still feel or view the splicing seams. Moreover, the greater the compression degree of the compressible transparent member 130 is (i.e. the smaller the tilt angle θa is), the smaller the light emitting angle (i.e. the included angle θc) of the second portion I2 of the image beam I coming from the display surface 112 of the display panel 110 is, which represents that the more a position of the second portion I2 of the image beam I is close to a border portion 144 (referring to FIG. 1), and the user is easy to view the border portion 144 (an invalid display region). In order to avoid the user to easily view the border portion 144, the tilt angle θa is, for example, required to be greater than 30 degrees.

To be specific, the tilt angle θa can be adjusted to a proper value according to the refractive index of the transparent plate 120 and the refractive index of the compressible transparent member 130. For example, the refractive index n of the transparent plate 120, the refractive index $n_E$ of the compressible transparent member 130 and the tilt angle θa can be designed to comply with a following equation:

$$n_E[\cos(\theta a)\cos(\sin^{-1}(\sin(\theta a/n_E))+\sin(\theta a)\sin(\sin^{-1}(\sin(\theta a)/n_E))]/\sqrt{[(2n^2-1)/2]} > 1.$$

The above equation represents that when the light emitting angle (i.e. the included angle θc) of the second portion I2 of the image beam I coming from the display surface 112 of the display panel 110 is smaller than 45 degrees, d the brightness of the image displayed by the second light emitting surface 132 of the compressible transparent member 130 is enough, though the invention is not limited thereto.

Referring to FIG. 1 and FIG. 2, in the embodiment, a plurality of optical microstructures 128 can be configured on the first light emitting surface 124 of the transparent plate 120. The optical microstructures 128 are adjacent to the side surface 126 of the transparent plate 120 for adjusting a light emitting angle at an edge of the first light emitting surface 124 of the transparent plate 120. In the embodiment, the optical microstructures 128 are, for example, a serrated structure, though the invention is not limited thereto, and other proper shapes can also be applicable, and the situation that the optical structures are not formed on the transparent plate 120 is also applicable.

Referring to FIG. 1 and FIG. 2, in the embodiment, the display device 100 includes a carrying structure 140, and the carrying structure 140 is connected to the display panel 110 and supports the transparent plate 120 on the display panel 110, such that the transparent plate 120 and the display panel 110 have a gap there between. In detail, the carrying structure 140 includes a supporting portion 142 and a border portion 144, where the border portion 144 covers a periphery of the display surface 112 of the display panel 110 and corresponds to the side surface 126, and the supporting portion 142 is connected to the border portion 144 and is used for supporting the transparent plate 120. The periphery of the display surface 112 of the display panel 110 that is covered by the border portion 144 is an invalid display region B, and the display surface 112 of the display panel 110 that is not covered by the border portion 144 is a valid display region A.

Figure 5:
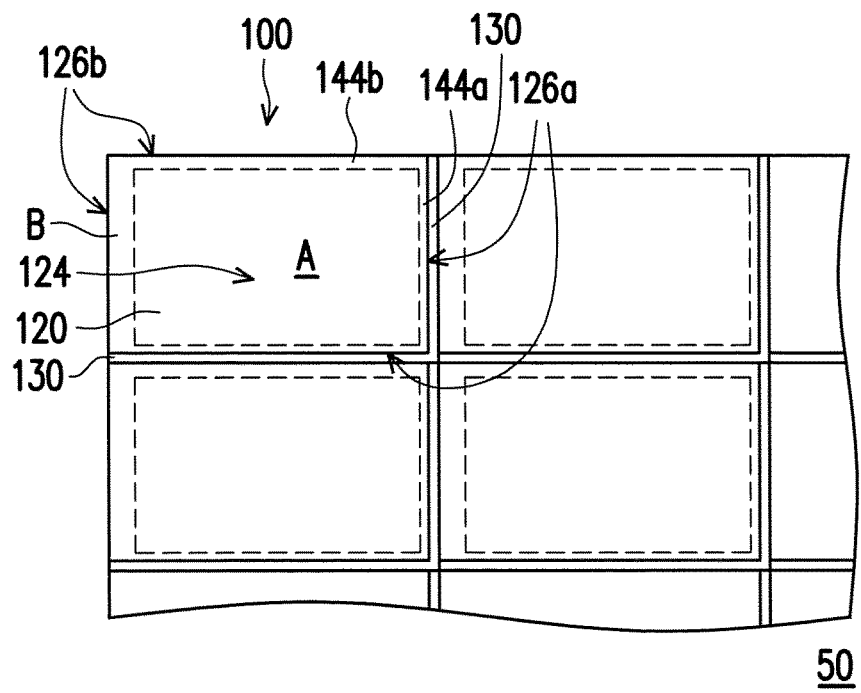
FIG. 5 is a front view of the display apparatus of FIG. 1.

FIG. 5 is a partial front view of the display apparatus of FIG. 1. Further, each of the transparent plates 120 is a rectangle and has a plurality of side surfaces 126 (for simplicity's sake, two side surfaces 126a and 126b are indicated in FIG. 5). Correspondingly, the number of the border portions 144 of the carrying structure 140 shown in FIG. 1 is plural (for simplicity's sake, two border portions 144a and 144b are indicated in FIG. 5), and the border portions 144 respectively correspond to the side surfaces 126 of the transparent plate 120. To be specific, the first side surface 126a and the second side surface 126b of FIG. 5 respectively correspond to the first border portions 144a and the second border portions 144b. As shown in FIG. 5, a width of the first border portion 144a is smaller than a width of the second border portion 144b, such that the valid display region A of the display panel 110 that is not covered by the border portions 144 is relatively close to the first side surface 126a. Correspondingly, the compressible transparent member 130 can be only configured on the first side surface 126a and is not configured on the second side surface 126b, such that the image beam of the valid display region A of the display panel 110 can be smoothly transmitted to the compressible transparent member 130 and emitted out from the compressible transparent member 130. As shown in FIG. 5, the compressible transparent member 130 disposed on the first side surface 126a of the transparent plate 120 of each of the display device 100 is leaned against the second side surface 126b of the transparent plate 120 of another display device 100, such that any two adjacent display devices 100 include the compressible transparent member 130 there between. As described above, by only configuring the compressible transparent member 130 to a part of the side surfaces 126 (i.e. the first side surface 126a) of the transparent plate 120, configuration cost of the compressible transparent members 130 is saved.

Figure 6:
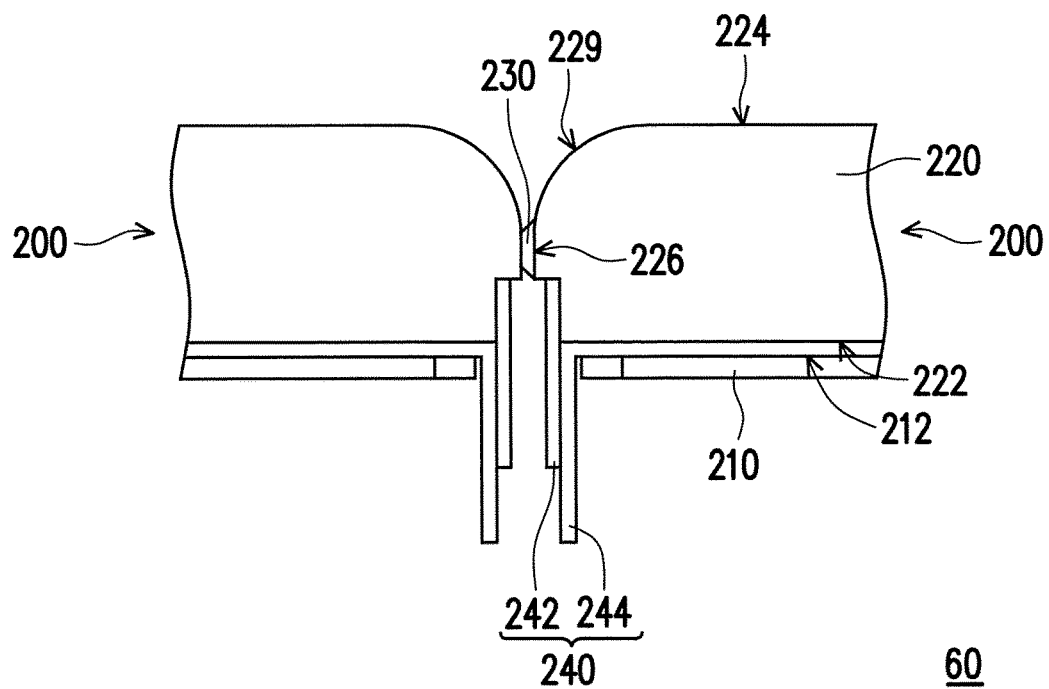
FIG. 6 is a partial cross-sectional view of display apparatus according to another embodiment of the invention.

FIG. 6 is a partial cross-sectional view of display apparatus according to another embodiment of the invention. In a display device 200 of the display apparatus 60, configurations and functions of a display panel 210, a display surface 212, a transparent plate 220, a light incident surface 222, a first light emitting surface 224, a side surface 226, a compressible transparent member 230, a carrying structure 240, a supporting portion 242 and a border portion 244 are similar to that of the display panel 110, the display surface 112, the transparent plate 120, the light incident surface 122, the first light emitting surface 124, the side surface 126, the compressible transparent member 130, the carrying structure 140, the supporting portion 142 and the border portion 144 of the display device of FIG. 1, and details thereof are not repeated. A difference between the display device 200 of the embodiment and the display device 100 of the aforementioned embodiment is that the transparent plate 220 has at least one cambered surface 229, and the cambered surface 229 is connected between the first light emitting surface 224 and the side surface 226, and is used for adjusting a light emitting angle at an edge of the first light emitting surface 224 of the transparent plate 220.

Figure 7:
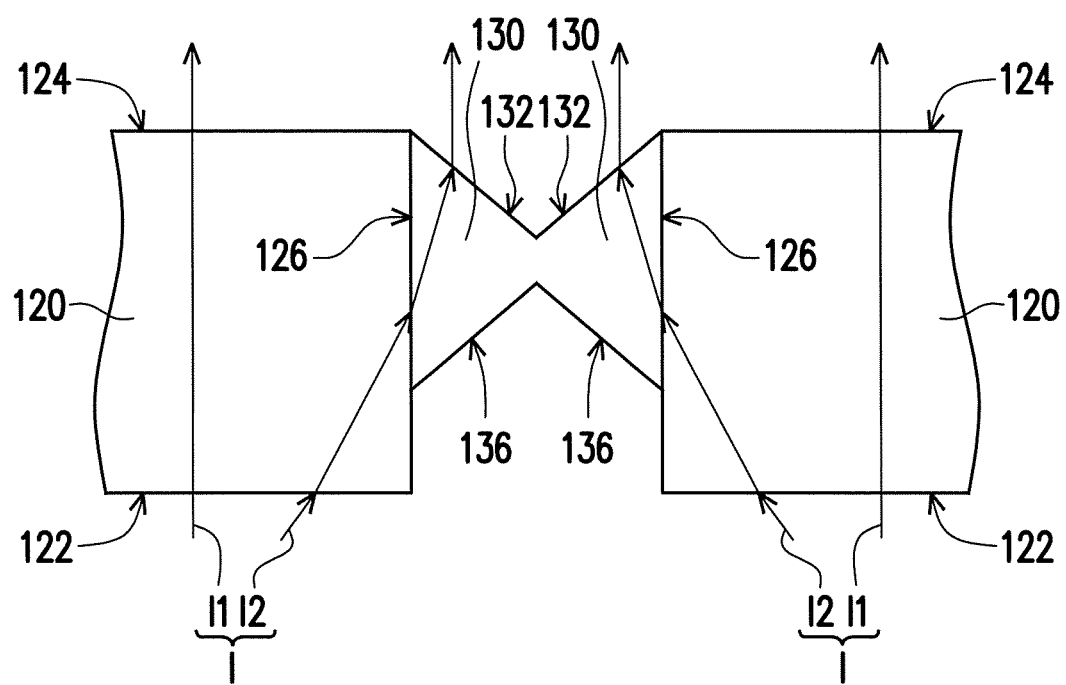
FIG. 7 is a partial cross-sectional view of display apparatus according to another embodiment of the invention.

FIG. 7 is a partial cross-sectional view of display apparatus according to another embodiment of the invention. A difference between the embodiment of FIG. 7 and the embodiment of FIG. 1 is that the compressible transparent member 130 of one display device 100 is aligned to and contacts the compressible transparent member 130 of another display device 100, such that two compressible transparent members 130 exist between two adjacent display devices 100.

In summary, the display device and display apparatus of the embodiments of the invention have at least one of following advantages. After the plurality of display devices of the invention are spliced into the display apparatus, each of the compressible transparent members is pressed to lean against between corresponding two adjacent display devices, so as to fill up the splicing seam between the two adjacent display devices. Since the light emitting surface (i.e. the second light emitting surface) of the compressible transparent member is tilted relative to the light emitting surface (i.e. the first light emitting surface) of the display device, an image beam sent from the display panel to the compressible transparent member can be refracted by the compressible transparent member, and emitted from the splicing seam along a direction perpendicular to the light emitting surface of the display device. In this way, the problem of visible black lines of the splicing seams is mitigated, and the display apparatus may display a correct image at the splicing seams.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display device, comprising:
   a display panel, having a display surface;
   a transparent plate, disposed on the display panel, wherein the transparent plate has a light incident surface and a first light emitting surface opposite to each other, the display surface and the light incident surface face each other, and the transparent plate has at least one side surface connected between the light incident surface and the first light emitting surface; and
   at least one compressible transparent member, disposed on the at least one side surface, wherein the at least one compressible transparent member has a second light emitting surface, and the second light emitting surface is tilted relative to the first light emitting surface.

2. The display device as claimed in claim 1, wherein a width of the at least one compressible transparent member along a direction parallel to the at least one side surface is gradually decreased along a direction away from the at least one side surface.

3. The display device as claimed in claim 1, wherein a distance between an extending surface of the first light emitting surface and the second light emitting surface is gradually increased along a direction away from the at least one side surface.

4. The display device as claimed in claim 1, wherein the at least one compressible transparent member has an attaching surface, the second light emitting surface is tilted relative to the attaching surface, and the attaching surface is attached to the at least one side surface.

5. The display device as claimed in claim 1, wherein the display panel is configured to emit an image beam, the image beam enters the transparent plate through the light incident surface, a first portion of the image beam is emitted out of the transparent plate through the first light emitting surface, and a second portion of the image beam enters the at least one compressible transparent member through the at least one side surface, and is emitted out of the at least one compressible transparent member through the second light emitting surface.

6. The display device as claimed in claim 5, wherein the first portion of the image beam is emitted out of the transparent plate along a first direction, and the second portion of the image beam is emitted out of the at least one compressible transparent member along a second direction, wherein the first direction is the same as the second direction.

7. The display device as claimed in claim 1, wherein a tilt angle of the second light emitting surface relative to the first light emitting surface is 30-60degrees.

8. The display device as claimed in claim 1, wherein the at least one compressible transparent member is complied with:

$$n_E[\cos(\theta a)\cos(\sin^{-1}(\sin(\theta a)/n_E))+\sin(\theta a)\sin(\sin^{-1}(\sin(\theta a)/n_E))]/\sqrt{[(2n^2-1)/2]}>1,$$

wherein $\theta a$ is a tilt angle of the second light emitting surface relative to the first light emitting surface, $n_E$ is a refractive index of the at least one compressible transparent member, and n is a refractive index of the transparent plate.

9. The display device as claimed in claim 1, wherein the number of the at least one side surface is plural, the number of the at least one compressible transparent member is plural, and the compressible transparent members are respectively configured on at least a part of the side surfaces.

10. The display device as claimed in claim 9, wherein the number of the compressible transparent members is two, and the two compressible transparent members are respectively configured on two adjacent side surfaces.

11. The display device as claimed in claim 1, wherein the first light emitting surface of the transparent plate has a plurality of optical microstructures, and the optical microstructures are located adjacent to the at least one side surface.

12. The display device as claimed in claim 1, wherein the transparent plate has at least one cambered surface, and the at least one cambered surface is connected between the first light emitting surface and the at least one side surface.

13. The display device as claimed in claim 1, wherein the display device comprises a carrying structure, wherein the carrying structure is connected to the display panel and supports the transparent plate on the display panel.

14. The display device as claimed in claim 13, wherein the number of the at least one side surface is plural, the side surfaces comprise at least one first side surface and at least one second side surface, the canying structure has at least one first border portion and at least one second border portion, the at least one first border portion and the at least one second border portion cover a periphery of the display surface and respectively correspond to the at least one first side surface and the at least one second side surface, a width of the at least one first border portion is smaller than a width of the at least one second border portion, and the at least one compressible transparent member is only disposed on the at least one first side surface.

15. A display apparatus, comprising:
   a plurality of the display devices as claimed in claim 1, and the display devices being spliced in an array, wherein the at least one compressible transparent member is compressed between the corresponding transparent plate and the transparent plate of another display device.

16. The display apparatus as claimed in claim 15, wherein the at least one compressible transparent member is aligned to and contacts the at least one compressible transparent member of another display device.

* * * * *